United States Patent [19]
Ganser

[11] Patent Number: 5,148,787
[45] Date of Patent: Sep. 22, 1992

[54] RETENTION DEVICE

[75] Inventor: Otmar Ganser, Frankfurt am Main, Fed. Rep. of Germany

[73] Assignee: VDO Adolf Schindling AG, Frankfurt am Main, Fed. Rep. of Germany

[21] Appl. No.: 759,417

[22] Filed: Sep. 13, 1991

[30] Foreign Application Priority Data

Oct. 24, 1990 [DE] Fed. Rep. of Germany ........ 4033803

[51] Int. Cl.$^5$ .............................................. F02D 9/08
[52] U.S. Cl. .................................... 123/337; 123/399
[58] Field of Search ......................... 123/399, 401, 337

[56] References Cited

U.S. PATENT DOCUMENTS

| | | | |
|---|---|---|---|
| 2,744,396 | 5/1956 | Nagy | 123/337 |
| 4,409,940 | 10/1983 | Gaus | 123/337 |
| 4,438,745 | 3/1984 | Watanabe | 123/337 |
| 4,759,326 | 7/1988 | Uthoff, Jr. et al. | 123/337 |
| 4,836,163 | 6/1989 | Muschalik | 123/337 |
| 4,860,706 | 8/1989 | Suzuki et al. | 123/337 |
| 5,027,766 | 7/1991 | Zentgraf et al. | 123/399 |
| 5,035,218 | 7/1991 | Takeuchi et al. | 123/399 |
| 5,038,733 | 8/1991 | Westenberger | 123/399 |
| 5,076,232 | 12/1991 | Pfalzgraf et al. | 123/399 |

FOREIGN PATENT DOCUMENTS

| | | | |
|---|---|---|---|
| 0123083 | 8/1984 | European Pat. Off. | 123/337 |
| 3912843 | 10/1990 | Fed. Rep. of Germany | 123/337 |
| 2585409 | 7/1985 | France | 123/337 |
| 9102891 | 3/1991 | PCT Int'l Appl. | 123/337 |

*Primary Examiner*—Raymond A. Nelli
*Attorney, Agent, or Firm*—Martin A. Farber

[57] ABSTRACT

A retention device 35 couples a load adjustment device to a throttle valve 2 which determines the output power of an internal combustion engine and is arranged fixed for rotation on a throttle-valve shaft 11. A clutch disk 8 of the clutch is connected fixed for rotation with the throttle-valve shaft 11 and also with the clutch 13, and is secured by means of a clamping device 35. The advantageous development of the clamping device 35 in combination with a coupling pin 10 makes it possible to mount and to lock the clutch anchor plate or clutch disk 8 against rotation without radial play, with the throttle valve shaft 11 entirely mounted. In addition, the clutch disk 8 can be axially secured in simple manner.

12 Claims, 2 Drawing Sheets

RETENTION DEVICE

FIELD AND BACKGROUND OF THE INVENTION

The present invention relates to a retention device for a coupling, particularly a coupling of an engine loadadjustment device (1), wherein the load-adjustment device has a throttle valve (2) which determines the power output of an internal combustion engine and is connected, fixed for rotation, with a throttle-valve shaft (11) mounted in a throttle valve housing, and wherein the shaft can be connected via a clutch (13) to a drive motor, the clutch having a first coupling part connected fixed for rotation with the throttle-valve shaft (11) via a clutch disk (8).

It is already generally known to secure the clutch of a throttle-valve shaft of a load adjustment device on the throttle-valve shaft. For this purpose, a clamping wedge is provided between the hub and the throttle-valve shaft, the wedge being clamped by a clamping screw which passes through it in a position which connects the hub with the throttle-valve shaft. In this way, locking against rotation is obtained.

SUMMARY OF THE INVENTION

In contradistinction to this, it is an object of the invention to arrange the clutch without radial play, in as flat as possible a construction, in rotation-locked manner on a shaft.

According to the invention, the clutch disk (8) can be fixed on the throttle-valve shaft (11) by a coupling pin (10) which can be secured by a clamping device. In this way, the clutch can be secured in radial direction on the shaft in simple manner, the locking forces being maintained small by the advantageous arrangement of the coupling pin. Furthermore, by the arrangement in accordance with the invention it is possible substantially to preassemble the setting member and only then fasten the clutch disk to the throttle-valve shaft.

For this purpose, it is advantageous that the clamping device (35) have at least one clamping part (36) of spring elasticity which can be pressed against the surface of the coupling pin (10).

It is another feature of the invention that the clamping device (35) consists of a spring plate (37) which is fastened on the clutch disk (8) and has at least two opposite spring-elastic clamping fingers (38) which are bent off in the direction towards the surface of the clutch disk (8) which clamping fingers are each provided on one side with an end edge (39) which can be brought to rest against the surface of the coupling pin (10). In this way, one obtains an easily handled connection between clutch disk and throttle-valve shaft without exposing the throttle-valve shaft or the other parts to particularly large surface pressure since this type of connection can be advantageously employed as bayonet closure.

As a further development of the invention, it is advantageous that the clamping fingers (38) be arranged in pairs and lie diametrically opposite two other clamping fingers (38) which are arranged in a pair. It is furthermore advantageous that the clamping fingers (38) be at least partially punched out and are on the one end integral with the spring plate (37) and have end edges (39) at the other end.

An additional possibility in accordance with a further development of the device of the invention is that the clutch disk (8) as well as the spring plate are axially as well as radially secured via the coupling pin (10).

It is furthermore advantageous that the clutch disk (8) can be secured axially as well as radially on the throttlevalve shaft (11) via the coupling pin (10), the coupling pin (10) extending through a hole (22) provided in the throttlevalve shaft (11).

In accordance with a special feature of the invention, it is provided that the opposite end edges (39) of the clamping fingers (38) form an angle which is open in the direction of the surface, the end edges (39) extending parallel to the longitudinal central axis of the coupling pin (10). In this way the coupling bolt is fastened in the desired position in simple manner.

It is of special importance in the device of the invention that the clamping part (36) form at its center with the surface of the clutch disk (8) a space to receive the coupling pin (10).

It is of particular importance for the present invention that a slot opening (33) corresponding to the inside width of the coupling pin (10) is provided in the clamping part (36) and that, upon the mounting, the clutch disk (8) can be pushed together with the clamping part (36) over the coupling pin (10) and then turned until the coupling pin (10) is locked between the two end edges (39) of the clamping fingers (38). With the throttle valve shaft premounted, the clutch disk can advantageously be secured for rotation within a very short time and be mounted and fastened on the throttle-valve shaft without radial play.

By the favorable arrangement of the individual parts and of the locking elements a very flat construction of the entire device is obtained.

In accordance with a further embodiment of the invention, at least one clamping finger (38) has a recess (40) which grips over the coupling pin (10).

For this purpose it is advantageous that the clamping finger (38) be provided on its free end facing the place of connection with a guide surface (41) which is inclined with respect to the surface of the clutch disk (8).

BRIEF DESCRIPTION OF THE DRAWING

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
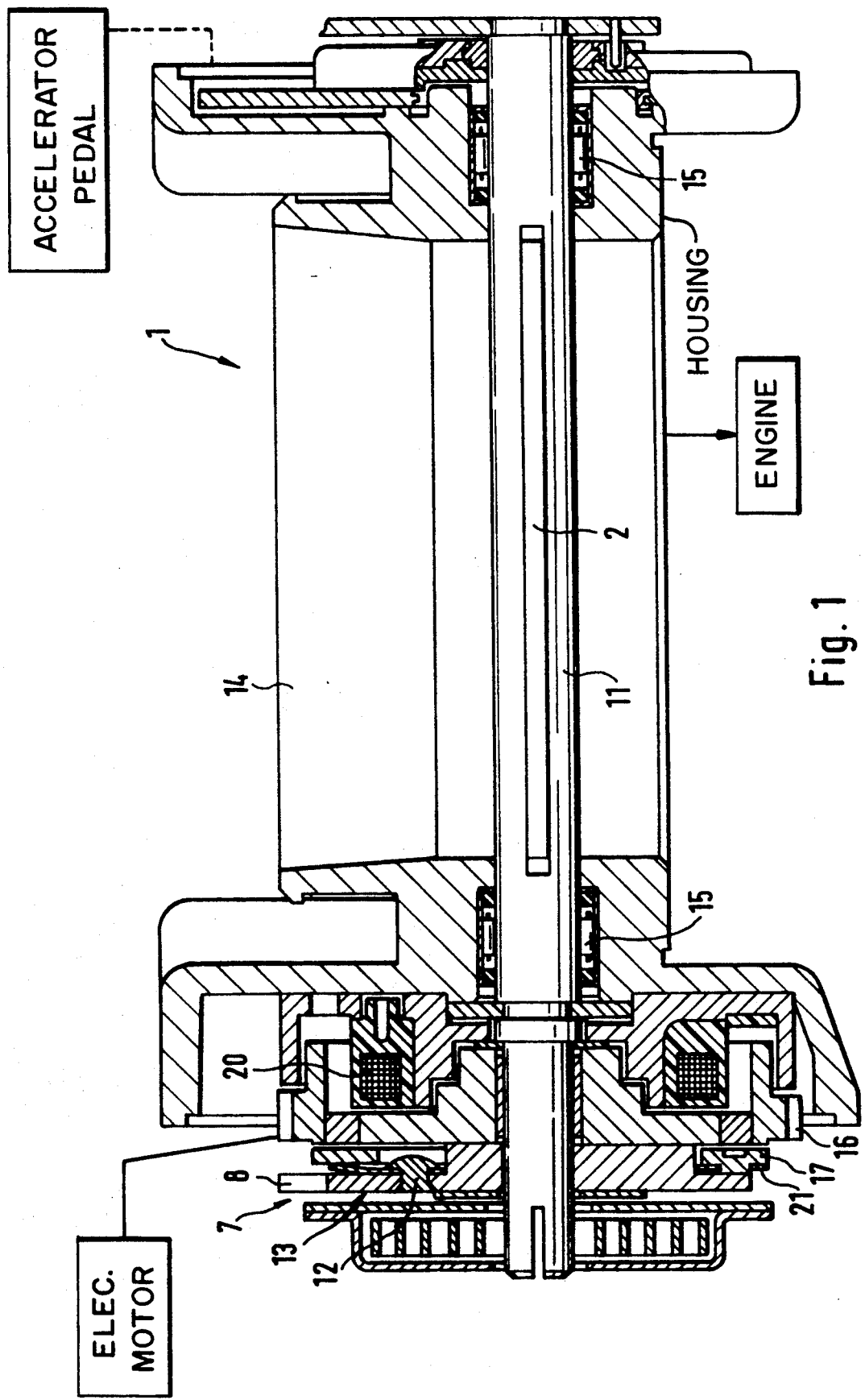
FIG. 1 is a longitudinal section through a clutch and a throttle-valve shaft of a load adjustment device having a clutch disk by which the clutch is connected fixed for rotation to the throttle-valve shaft.

The setting member shown in FIG. 1 is part of a load adjustment device 1, parts of the load adjustment device having been omitted for the sake of simplicity in order better to show the parts which are essential to the invention. The load adjustment device 1 comprises an electric motor, indicated diagrammatically in the drawing, which is connected for drive via a gearing 7, merely diagrammatically indicated, with a throttle-valve shaft 11. Via the gearing 7 the setting forces of the electric motor are transmitted to a throttle valve 2 and, in this way, displacement of the valve 2 into the desired position is brought about.

As can be noted from FIG. 1, the load adjustment device 1 can be displaced via an accelerator pedal, indicated diagrammatically in the drawing, in which connection by actuation of the accelerator pedal a lever of the load adjustment device 1 is shifted between an idle stop and a full load stop and can be urged by a return spring in the idling direction. The accelerator pedal is connected by a gas cable to a driver and thus to the throttle-valve shaft 11 so that upon actuation of the accelerator pedal the driver is displaced in the direction towards the full load stop. Return springs are connected to the driver and urge it in the idling direction.

The load adjustment device 1 has, in addition to the electric motor, a gearing 7 which can be connected for drive with the throttle valve shaft 11 via a clutch 13.

As can be noted from FIG. 1, the throttle-valve shaft 11 extends through a throttle-valve connection 14 which is part of a throttle-valve housing. The throttle-valve shaft 11 is mounted for rotation by means of two needle bearings 15 in the housing of the throttle valve shaft 11.

The drive of the throttle-valve shaft 11 is effected via a drive gear 16 which is connected for drive to the electric motor. The drive gear 16 is mounted for rotation on the throttle-valve shaft 11 and can be connected via a coupling rotor 17 and a spring plate 21 to a clutch disk or pole disk 8 fixed for rotation with the throttle valve shaft 11.

Figure 2:
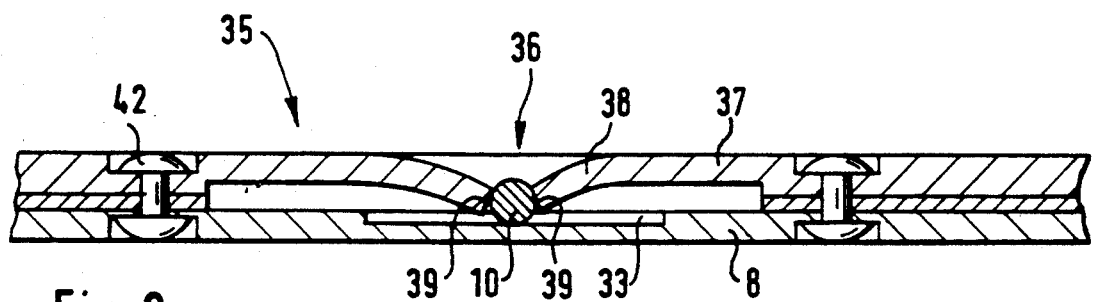
FIG. 2 is a longitudinal section through the clutch disk along the line A—B of FIG. 3, in which individual parts have been omitted for the sake of simplicity.
Figure 3:
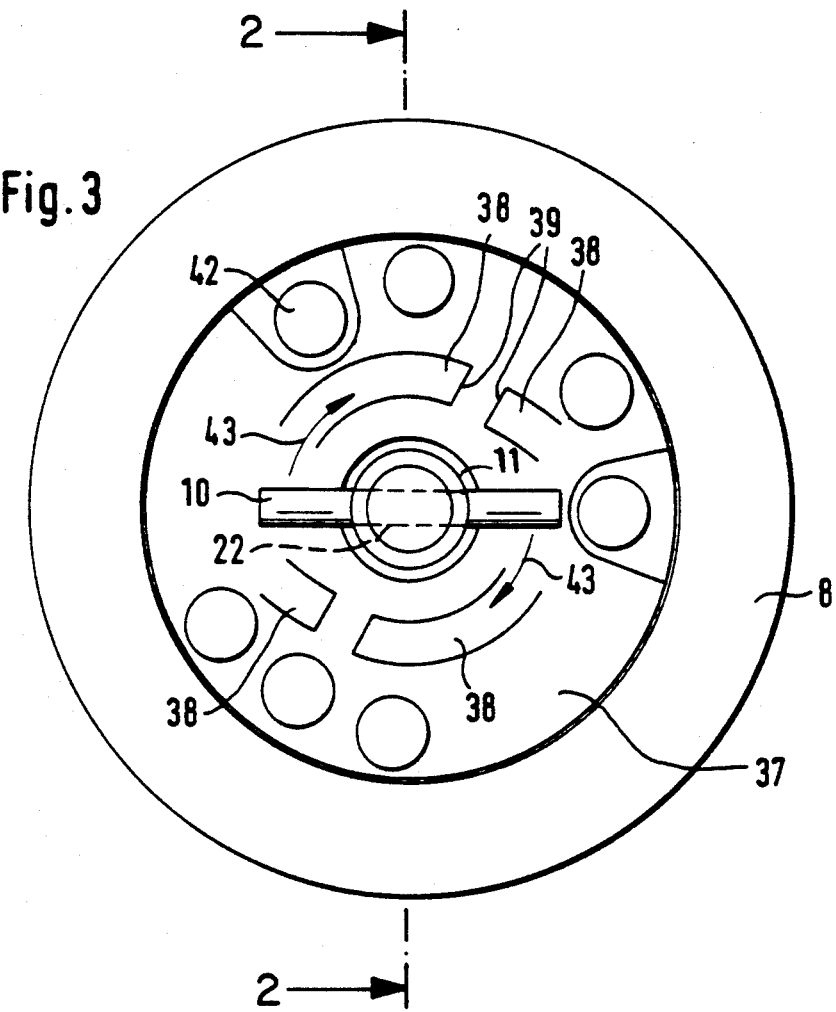
FIG. 3 is a top view of the clutch disk.
Figure 4:
FIG. 4 shows another embodiment of the clamping device shortly before the introduction of the clamping bolt.
Figure 5:
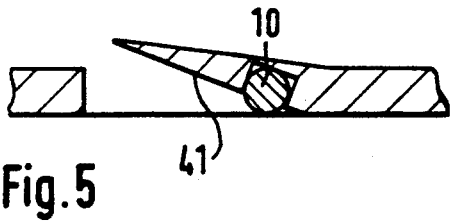
FIG. 5 shows the clamping device of FIG. 4 with the clamping bolt in its retention position.

The clutch disk 8 is shown in further detail in FIGS. 2, 3 and 4. The clutch disk 8, as shown in FIG. 1, is connected by numerous rivets 12 to the clutch rotor 17 in such a manner that, within a small region, the clutch rotor 17 can be axially displaced when a magnet coil 20, forming part of the clutch 13, is acted on by current. The coil then attracts the clutch disk 8 via the clutch rotor 17 so that the disk comes against the end surface of the clutch rotor 17. In this way, there is a friction-locked connection between the clutch disk 8, the clutch rotor 17 and the electric motor (not shown in the drawing) for the displacement of the throttle valve shaft 11.

As can be noted from FIGS. 2 and 3, the clutch disk 8 is connected, fixed for rotation, to the throttle valve shaft 11 by a coupling pin 10. The clutch disk 8 has an elongated opening 33 to receive the coupling pin 10 and the throttlevalve shaft 11 has a hole 22 into which the coupling pin 10 is introduced in order, in this way, to produce a drive connection between the clutch 13 and the throttle-valve shaft 11. By the use of a coupling pin 10, the connecting forces or pressing forces for the connection in rotation between clutch 13 and throttle-valve shaft 11 can be kept very small. Furthermore, premounting of the clutch 13 on the throttlevalve shaft 11 is possible.

The coupling pin 10 can be secured in the hole 22 of the throttle-valve shaft 11 by a clamping device 35. The clamping device 35 is developed as a spring plate 37 in the embodiment shown. The clamping device 35 consists of the spring plate 37 fastened on the clutch disk 8 and connected by numerous rivets to the clutch disk 8.

In the spring plate 37 there are clamping fingers 38 which are arranged in pairs. Diametrically opposite these clamping fingers 38 there are two further clamping fingers 38 arranged in pairs. The spring plate 37, together with the individual clamping fingers, forms a sort of bayonet lock for the holding fast of the coupling pin 10.

The clamping fingers 38 are at least partially stamped out and integral at one end with the spring plate 37. On the other end, they have front edges 39 which rest in the end position of the coupling pin 10 against the surface of the coupling pin 10 and thus secure the clutch disk 8 both axially and radially on the throttle valve shaft 11.

The opposite end edges 39 of the clamping fingers 38 advantageously form an angle which is open in the direction of the surface. The end edges 39 extend parallel to the longitudinal central axis of the coupling pin 10. In this way, after the mounting of the clutch disk 8, the latter is held fast in simple manner on the throttle-valve shaft 11. By means of the downwardly bent clamping fingers 38 and the obliquely extending front edges 39, the coupling pin 10 is pressed in installed condition in simple manner against the surface of the clutch disk 8.

In the clutch disk 8 there is an elongated opening 33 which is somewhat larger than the coupling pin 10 and the outside diameter of the throttle-valve shaft 11. In this way, the clutch 13, which is at least partially preassembled, can be mounted on the throttle-valve shaft 11. The clutch disk 8 is then pushed onto the throttle-valve shaft 11 until the clamping part 36 receives the coupling pin 10 which is already mounted on the throttle-valve shaft 11. Upon the mounting of the clutch disk 8, the latter is first of all pushed by means of the opening 33 over the coupling pin 10 (see FIG. 3), whereupon the clutch disk 8 is turned to such an extent in accordance with arrow 43 that the coupling pin 10 engages between the opposite end edges 39. In this way the mounting of the clutch disk is completed.

In accordance with another embodiment, the clamping fingers 38 or at least one clamping finger 38 can be provided with a recess 40 which engages over the coupling pin 10. The recess 40 the same function as the two opposite end edges 39 of the clamping fingers 38. In order to facilitate the introduction of the coupling bolt 10 into the recess 40, the clamping finger 38 is provided on its free end, opposite the place of connection, with a guide surface 41 which is inclined with respect to the surface of the clutch disk 8.

I claim:

1. A retention device for a coupling suitable for an engine load-adjustment apparatus, wherein the engine load-adjustment apparatus includes a throttle valve, a throttle-valve shaft, a throttle-valve housing, a clutch having a clutch disk, and a drive motor, wherein the throttle valve which determines the power output of an internal combustion engine and is connected, fixed for rotation, with the throttle-valve shaft mounted in the throttle valve housing, and wherein the shaft is connected via the clutch to the drive motor, one coupling part of the clutch being connected fixed for rotation with the throttle-valve shaft via the clutch disk; wherein the retention device comprises a coupling pin, and a clamping device secured to the clutch disk; and the clutch disk is fixed on the throttlevalve shaft by the coupling pin, and the coupling pin is retained by the clamping device for securing the clutch in radial direction on the shaft with locking forces being maintained by the coupling pin.

2. A retention device according to claim 1, wherein the clamping device has at least one clamping part of spring elasticity which presses against a surface of the coupling pin.

3. A retention device according to claim 1, wherein the clamping device comprises a spring plate which is fastened on the clutch disk and has a least two opposite spring-elastic clamping fingers which are bent off in the direction towards a surface of the clutch disk; and the clamping fingers are provided each on one side with an end edge for resting against the surface of the coupling pin.

4. A retention device according to claim 3, wherein there is a plurality of the clamping fingers arranged in pairs; and two clamping fingers of one of said pairs lie diametrically opposite two other clamping fingers of another of the pairs.

5. A retention device according to claim 3, wherein each of the clamping fingers is at least partially punched out and has one end integral with the spring plate and has an end edge at a second end opposite the first end.

6. A retention device according to claim 1, wherein the clutch disk is axially as well as radially secured via the coupling pin.

7. A retention device according to claim 1, wherein the clutch disk is secured axially as well as radially on the throttle-valve shaft via the coupling pin, the coupling pin extending through a hole provided in the throttle-valve shaft.

8. A retention device according to claim 5, wherein the opposite end edges of the clamping fingers form an angle which is open in the direction of the surface, the end edges extending parallel to a longitudinal central axis of the coupling pin.

9. A retention device according to claim 1, wherein the clamping device forms at its center with a surface of the clutch disk a space to receive the coupling pin.

10. A retention device according to claim 8, further comprising a slot opening with width corresponding to the coupling pin and located in the clamping device; and wherein upon a mounting of the clutch to the shaft, the clutch disk is pushed together with the clamping device over the coupling pin, and then is turned about an axis of the shaft to lock the coupling pin between the end edges of two of the clamping fingers.

11. A retention device according to claim 5, wherein at least one of the clamping fingers has a recess which grips over the coupling pin.

12. A retention device according to claim 11, wherein at least one of the clamping fingers is provided in its free end facing a plane of connection with a guide surface which is inclined with respect to a surface of the clutch disk.

* * * * *